(12) United States Patent
Ichinose et al.

(10) Patent No.: US 8,814,277 B2
(45) Date of Patent: Aug. 26, 2014

(54) RUSTPROOF COVER FOR AUTOMOBILE DISK BRAKE

(75) Inventors: Hidemi Ichinose, Kameyama (JP); Yoshimine Miyagawa, Suzuka (JP); Hisao Asano, Aichi (JP); Mineko Asano, legal representative, Aichi (JP); Toru Matsuda, Tokyo (JP); Takashi Kawashima, Nagoya (JP)

(73) Assignee: Honda Motor Co., Ltd., Tokyo (JP)

( * ) Notice: Subject to any disclaimer, the term of this patent is extended or adjusted under 35 U.S.C. 154(b) by 755 days.

(21) Appl. No.: 12/993,748

(22) PCT Filed: May 13, 2009
(Under 37 CFR 1.47)

(86) PCT No.: PCT/JP2009/058923
§ 371 (c)(1),
(2), (4) Date: Jul. 11, 2011

(87) PCT Pub. No.: WO2009/142134
PCT Pub. Date: Nov. 26, 2009

(65) Prior Publication Data
US 2011/0278910 A1    Nov. 17, 2011

(30) Foreign Application Priority Data
May 19, 2008  (JP) ................................ 2008-131283

(51) Int. Cl.
*B60B 7/08*  (2006.01)

(52) U.S. Cl.
USPC .................... 301/37.34; 301/37.41; 301/37.42

(58) Field of Classification Search
USPC .......... 301/37.31, 37.34, 37.12, 37.41, 37.42, 301/37.102
See application file for complete search history.

(56) References Cited

U.S. PATENT DOCUMENTS 5,992,942 A * 11/1999 Passoth et al. ........... 301/37.372
6,517,168 B1 * 2/2003 Van Houten ............... 301/37.42
7,510,248 B2 * 3/2009 Wang ........................ 301/37.33

FOREIGN PATENT DOCUMENTS

JP          56-36562       4/1981
JP           7-14660       4/1995

* cited by examiner

*Primary Examiner* — Dennis H Pedder
(74) *Attorney, Agent, or Firm* — Nelson Mullins Riley & Scarborough LLP; Anthony A. Laurentano (57) ABSTRACT

A rustproof cover for an automobile disk brake which is attached to a surface portion of a disk portion of a automobile wheel so as to shield a plurality of penetration portions penetrating the disk portion in a direction from the surface portion of the disk portion to a rear-surface portion thereof, the rustproof cover comprising, a recessed portion which is recessed from the surface portion of the disk portion to the rear-surface portion thereof so as to follow the shape of each penetration portion, wherein each recessed portion includes a protrusion portion which engages with a rear surface of the disk portion at the rear-surface portion of the disk portion so as to prevent a separation of the rustproof cover, and wherein the rustproof cover is formed of a flexible resin.

1 Claim, 5 Drawing Sheets

RUSTPROOF COVER FOR AUTOMOBILE DISK BRAKE

RELATED APPLICATIONS

This application is a 35 U.S.C. 371 national stage filing of International Application No. PCT/JP2009/058923, filed May 13, 2009, which claims priority to Japanese Patent Application No. 2008-131283 filed on May 19, 1008 in Japan. The contents of the aforementioned applications are hereby incorporated by reference.

TECHNICAL FIELD

The present invention relates to a rustproof cover for an automobile disk brake.

Priority is claimed on Japanese Patent Application No. 2008-131283, filed on May 19, 2008, the contents of which are incorporated herein by reference.

BACKGROUND ART

In the past, a disk portion of a wheel (disk wheel) of an automobile has been provided with a plurality of penetration portions penetrating the wheel for the purpose of reducing the weight and decorating the wheel, as well as for cooling a brake disposed inside the wheel.

However, in the case where an automobile is exported by means of sea transport for a long time, since the automobile wheel of the automobile is exposed to an atmosphere containing salt and moisture, the salt and moisture penetrate the automobile wheel of the automobile via the penetration portions, thereby causing a problem in that rust is caused in a rotor of a disk brake disposed inside the wheel.

In order to suppress such a problem, there is known a rustproof cover which is provided on a surface portion (outside) of the disk portion of the wheel so as to temporarily shield the penetration portions (for example, see Patent Document 1 and Patent Document 2).

It is desirable that the rustproof cover may be formed of a thin resin. The rustproof cover should not be easily separated from the wheel due to vibration or the like during transport, and should be easily separated from the wheel during a separation operation. In addition, since the rustproof cover is generally scrapped by a consignee, it is necessary to suppress an increase in the manufacture cost.

Patent Document 1 discloses a disk-shaped rustproof cover which is formed of a thin hard synthetic resin such as a hard vinyl chloride resin. The rustproof cover is provided with a plurality of radial and circular-arc ribs so as to improve the strength of the rustproof cover. In addition, a plurality of cap-shaped locking portions penetrating the rustproof cover is attached to the center portion of the rustproof cover, and the plurality of locking portions is fitted to a plurality of wheel nuts thereby attaching the rustproof cover to the disk portion of the wheel.

Patent Document 2 discloses a disk-shaped rustproof cover which is formed of a thin synthetic resin. The rustproof cover is elastically fitted to the inner periphery of each penetration portion by means of a matching operation with the outer periphery of the disk portion of the wheel or an individual matching operation thereof.

PRIOR DOCUMENT

Patent Document

[Patent Document 1] Japanese Utility Model Application Publication No. H07-014660

[Patent Document 2] Japanese Utility Model Application Laid-Open No. S56-036562

DISCLOSURE OF THE INVENTION

Problem that the Invention is to Solve

Incidentally, in the configuration disclosed in Patent Document 1, since the plurality of locking portions is required to be fitted to the plurality of wheel nuts, the number of attaching operations increases, which results in complicating the separation operation. In addition, since the rustproof cover and the locking portions are consumables and are separated from the wheel to be scrapped by a consignee, a manufacture cost increases. In the case of long-distance transport for the exporting or the like, there is a difference in the fitting levels between the wheel nuts and the locking portions due to an ambient temperature difference between the location of a sender and that of a consignee, thereby causing a problem in that it is difficult to separate the locking portions from the wheel nuts.

In addition, in the configuration disclosed in Patent Document 2, particularly in the case where a comparatively large difference in the heat expansion coefficients between the wheel and the rustproof cover occurs as in the case where the rustproof cover is attached to the wheel formed of aluminum alloy, a problem arises in that the rustproof cover is separated from the wheel, the rustproof cover is difficult to be attached to or detached from the wheel, or the rustproof cover is broken. For this reason, it is troublesome to continuously monitor the rustproof cover.

An object of the present invention is to provide a rustproof cover for an automobile disk brake capable of being easily attached to or detached from a wheel with a simple configuration and of suppressing an effect caused by a difference in the heat expansion coefficients between itself and the wheel.

Means for Solving the Problem

According to an aspect of the invention, there is provided a rustproof cover for an automobile disk brake which is attached to a surface portion of a disk portion of a automobile wheel so as to shield a plurality of penetration portions penetrating the disk portion in a direction from the surface portion of the disk portion to a rear-surface portion thereof, the rustproof cover comprising, a recessed portion which is recessed from the surface portion of the disk portion to the rear-surface portion thereof so as to follow the shape of each penetration portion, wherein each recessed portion includes a protrusion portion which engages with a rear surface of the disk portion at the rear-surface portion of the disk portion so as to prevent a separation of the rustproof cover, and wherein the rustproof cover is formed of a flexible resin.

The rustproof cover may further include a bellows portion which is capable of expanding or contracting in a radial direction of the rustproof cover.

Advantage of the Invention

According to the invention, the engagement amount (engagement allowance) of the protrusion portion with respect to the rear surface of the disk portion is set to a minimum value by predicting a difference in the heat expansion coefficients between the rustproof cover and the wheel formed of metal such as aluminum alloy. Accordingly, at the time when the rustproof cover is attached to or detached from the wheel, it is possible to carry out the attaching or detaching operation of the rustproof cover by bending the peripheral portion of the protrusion portion with respect to the penetration portion in such a manner that the recessed portion is just pressed into the penetration portion or is just taken out from the penetration portion. That is, it is possible to easily attach or detach the rustproof cover to or from the wheel with a simple configuration.

In addition, even in the case where the rustproof cover expands or contracts with respect to the wheel due to a difference in the heat expansion coefficients between the rustproof cover and the wheel, since the whole cover is formed of a flexible resin, it is possible to prevent the problem the rustproof cover is difficult to be attached to or detached from the wheel or the separation or breakage of the rustproof cover occurs. That is, it is possible to suppress an effect caused by a difference in the heat expansion coefficients between the rustproof cover and the wheel.

DETAILED DESCRIPTION OF THE INVENTION

Hereinafter, an exemplary embodiment of the present invention will be described with reference to the accompanying drawings. In addition, in the following description, an axial direction, a circumferential direction, and a radial direction of one automobile wheel of an automobile are used.

When an automobile is exported by means of sea transport for a long time, a rustproof cover 1 shown in FIGS. 1 to 4 is attached to a surface portion (outside) of a disk portion 55 of a wheel (disk wheel) 50 of a automobile wheel thereof so as to temporarily shield a plurality of (for example, seven) penetration portions 51 formed in the disk portion 55, thereby suppressing an occurrence of rust in a rotor (not shown) of a disk brake disposed inside the wheel 50. In addition, for the convenience of description, only one-side half of the rustproof cover 1 is shown when viewed from the top (from an axial direction) in FIGS. 1 and 3.

The rustproof cover 1 is formed of a flexible resin such as polypropylene having a shape retaining property, and has a thin shape having a substantially uniform thickness of about 0.5 mm. The rustproof cover 1 is molded in a disk shape so as to face the disk portion 55 of the wheel 50.

Figure 1:
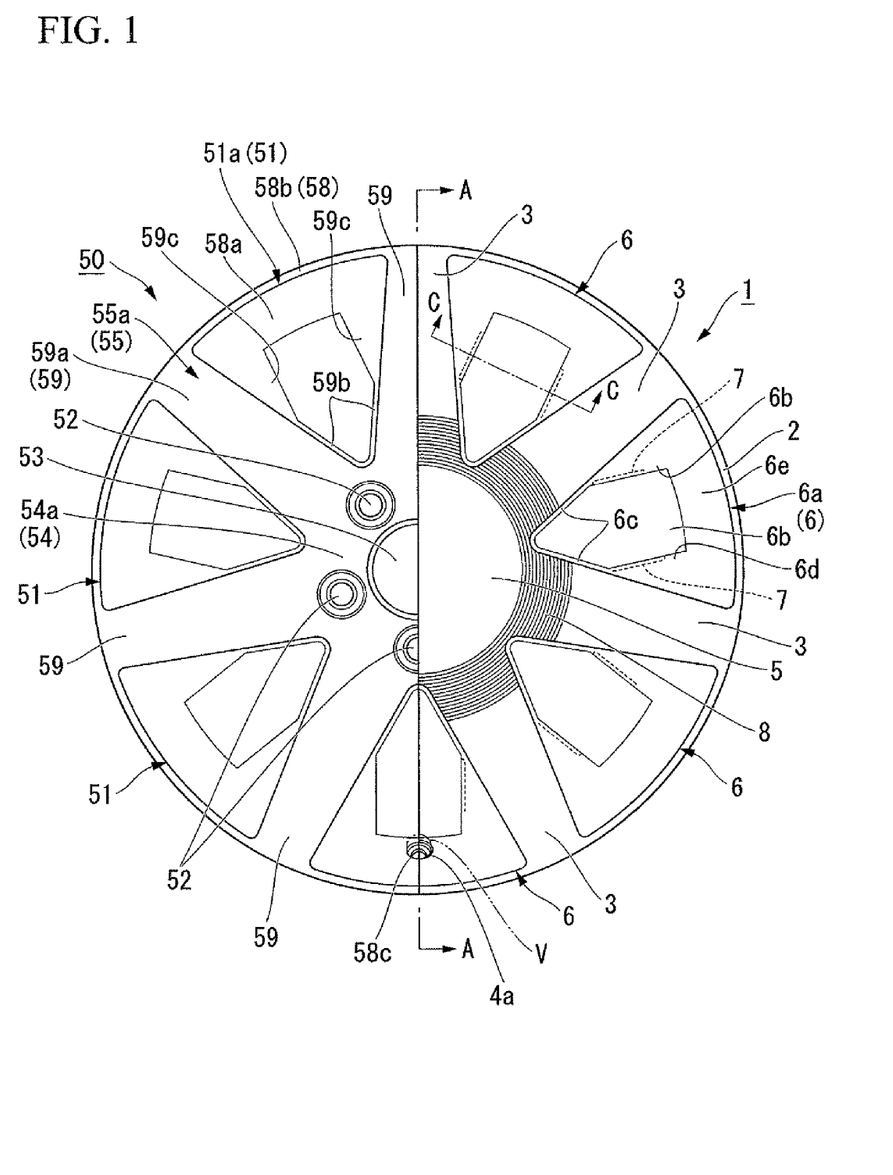
FIG. 1 is a top view showing a state where a wheel is attached with a rustproof cover according to an embodiment of the invention.
Figure 2:
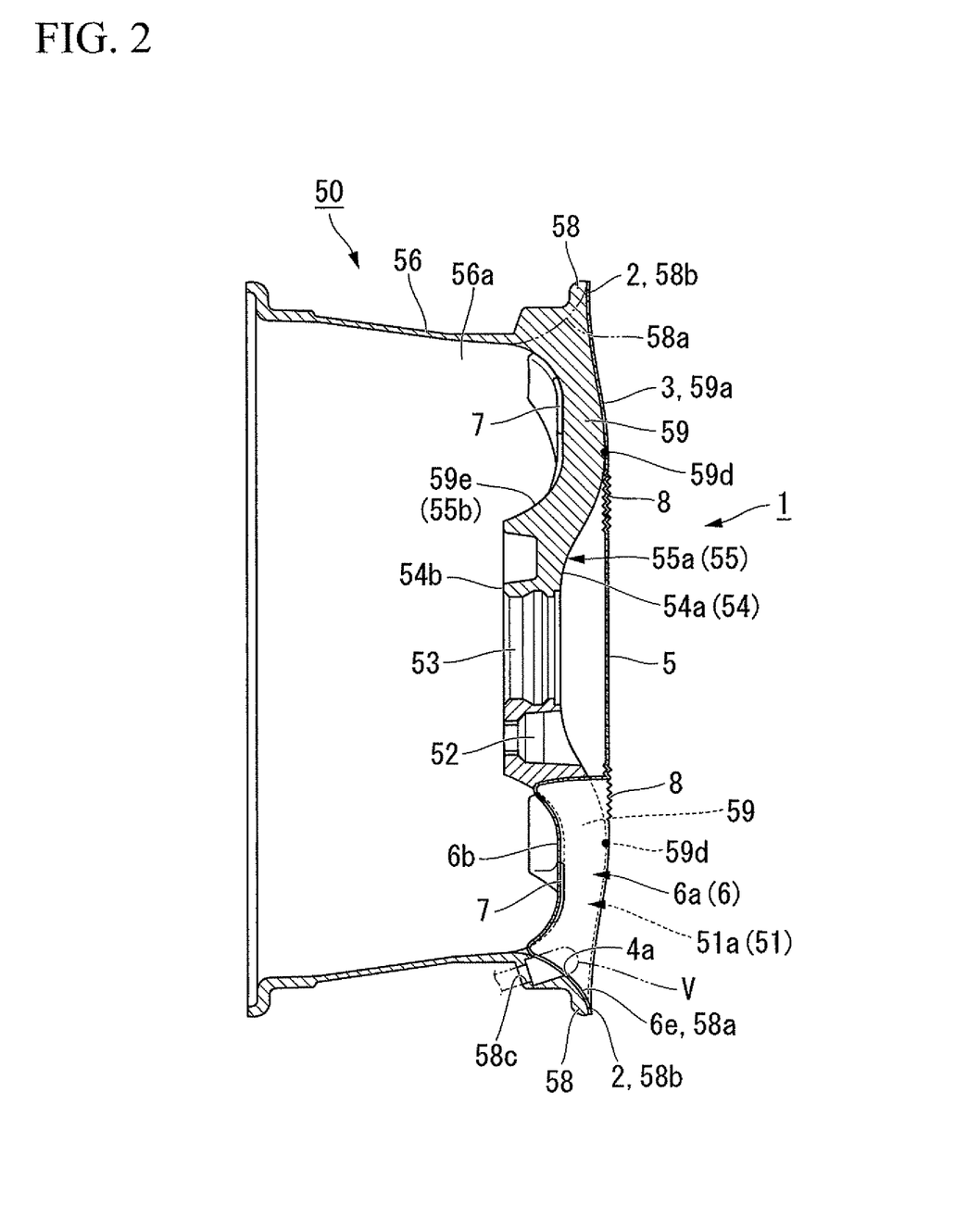
FIG. 2 is a sectional view taken along the line A-A in FIG. 1.

FIG. 1 is a top view showing the state where the wheel is attached with the rustproof cover according to the embodiment of the present invention. FIG. 2 is a sectional view taken along the line A-A in FIG. 1. The wheel 50 is a product formed of aluminum alloy by casting (or forging). The wheel 50 includes the disk-shaped disk portion 55 and an annular rim portion 56 which is integrally formed with the axial inner portion of the disk portion 55. A hub and a disk brake (not shown) of a automobile are disposed in a space 56a which is opened inward in an axial direction in the inside of the wheel 50. The outer periphery of the rim portion 56 is attached with a tire (not shown), and the automobile wheel of an automobile is formed by the tire and the wheel 50.

The disk portion 55 of the wheel 50 is integrally formed with a hub portion 54 which forms the center portion of the disk portion, a rim flange portion 58 which forms the outer peripheral edge of the disk portion, an a plurality of (for example, seven) spoke portions 59 which is formed between the hub portion 54 and the rim flange portion 58. Each of the penetration portions 51 is formed between the adjacent spoke portions 59 so as to penetrate the wheel 50. The disk portion 55 is formed to be thick in order to ensure its strength.

The hub portion 54 has a hub hole 53 which is formed at the center of the hub portion so as to penetrate a hub shaft end. The periphery of the hub hole 53 is provided with a plurality of (for example, five) insertion holes 52 through which a hub bolt and a hub nut (not shown) are inserted, where the hub bolt extends outward in an axial direction from the hub and the hub nut is fastened to the hub bolt.

The rim flange portion 58 is used to form an axial outer portion of the rim portion 56, thereby forming a rim inner peripheral surface 58a which is formed in a curved shape so as to protrude outward in an axial direction and inward in a radial direction. In other words, the rim inner peripheral surface 58a is formed in a taper shape so as to be wider outward in an axial direction (a direction closer to the surface portion of the disk portion 55).

Each spoke portion 59 extends in a linear shape (radial shape) outward in an radial direction from the outer periphery of the hub portion 54 in the top view in FIG. 1, and the radial outer end comes into contact with the rim inner peripheral surface 58a of the rim flange portion 58 so as to be integrally connected thereto. The spoke portion 59 forms a spoke surface 59a (outer surface) which is slightly thinned toward its end so that the outer radial width is narrowed in a top view. The spoke portion 59 is formed in an axisymmetric shape with respect to the radius, serving as the central axis (symmetric axis), of the disk portion 55 in a top view.

The radial outer portion of the spoke portion 59 is provided with the spoke surface 59a which is thinned toward its end as described above. Both side surfaces of the spoke portion 59 have a shape in which the width is widened inward in an axial direction and outward in a radial direction from the spoke surface 59a in a top view. Hereinafter, among both side surfaces of the spoke portion 59, the radial inner portion is referred to as an inner spoke side surface 59b and the radial outer changed portion is referred to as an outer spoke side surface 59c.

The spoke portion 59 is formed in a curved shape so as to protrude outward in an axial direction in the sectional view in FIG. 2. The reference numeral 59d in FIG. 2 indicates a curved top portion which is curved outward in an axial direction of the spoke portion 59 (spoke surface 59a).

In the spoke surface 59a of the spoke portion 59, the radial outer portion is smoothly continuous to the axial outer end (hereinafter, referred to as a rim surface 58b (outer surface)) of the rim inner peripheral surface 58a of the rim flange portion 58, and the radial inner portion is smoothly continuous to a hub surface 54a (outer surface) of the hub portion 54. The hub surface 54a (hub portion 54) is formed in a recessed shape so as to be depressed inward in an axial direction (closer to the rear-surface portion of the disk portion 55) more than the spoke surface 59a (spoke portion 59) and the rim surface 58b (rim flange portion 58).

A surface 55a of the disk portion 55 is formed by the spoke surface 59a, the rim surface 58b, the hub surface 54a, the inner spoke side surface 59*b*, the outer spoke side surface 59*c*, and the rim inner peripheral surface 58*a* disposed inside the penetration portion 51.

By referring to FIG. 2, a rear surface 54*b* (inner surface) of the hub portion 54 is formed in a plane shape perpendicular to an axial direction. A rear surface 59*e* (inner surface) of the spoke portion 59 is formed in a curved shape so as to protrude outward in an axial direction. A rear surface 55*b* of the disk portion 55 is formed by the rear surfaces 54*b* and 59*e*.

Each penetration portion 51 of the disk portion 55 is used for the purpose of, for example, cooling the disk brake disposed inside the wheel 50 in addition to the purpose of decreasing the weight or a design of the wheel 50. Each penetration portion 51 is formed in an axisymmetric shape with respect to the radius serving as the central axis (symmetric axis) of the disk portion 55 in a top view.

Figure 3:
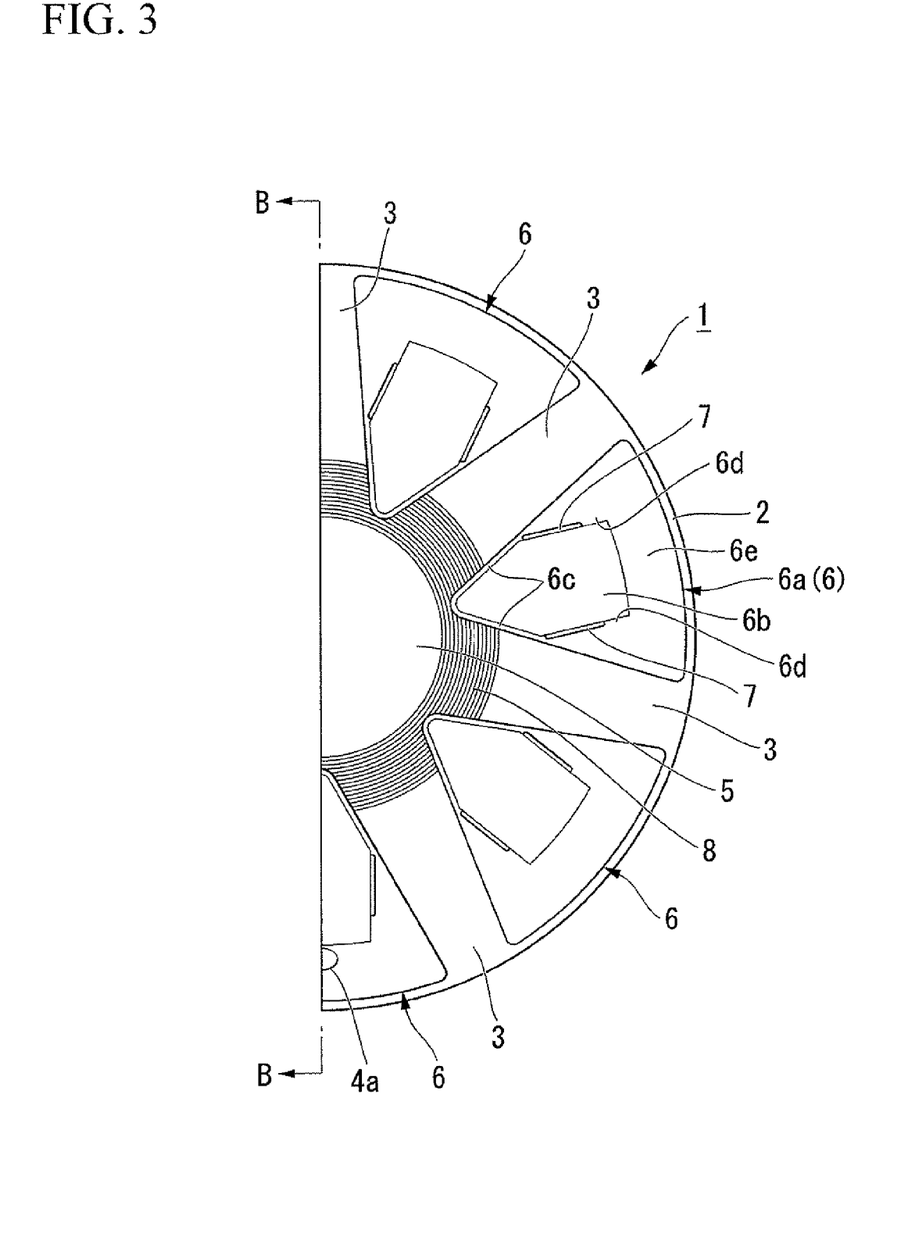
FIG. 3 is a view showing a rear surface of the rustproof cover.

In the rear surface 55*b* of the disk portion 55, each penetration portion 51 is formed as a substantially pentagonal penetration portion which is surrounded by the pair of inner spoke side surfaces 59*b* of the adjacent spoke portions 59, the pair of outer spoke side surfaces 59*c* thereof, and the axial inner end of the rim inner peripheral surface 58*a* in a top view. In addition, in the surface 55*a* of the disk portion 55, each penetration portion 51 is formed as a substantially triangular penetration portion which is surrounded by the pair of inner spoke side surfaces 59*b*, the pair of outer spoke side surfaces 59*c*, and the axial outer end of the rim inner peripheral surface 58*a* in a top view. Here, an inner peripheral surface 51*a* of each penetration portion 51 is formed by the pair of inner spoke side surfaces 59*b*, the pair of outer spoke side surfaces 59*c*, and the rim inner peripheral surface 58*a*.

The inner spoke side surface 59*b* is formed along a substantially axial direction (in detail, the inner spoke side surface 59*b* is widened outward in an axial direction at a draft angle upon forming the wheel 50). The outer spoke side surface 59*c* and the rim inner peripheral surface 58*a* are formed in a taper shape so as to be widened outward in an axial direction. In addition, the rim flange portion 58 of one penetration portion 51 is provided with a valve attachment hole 58*c* which supports an air valve V so that the air valve V penetrates the penetration portion 51.

Next, the rustproof cover 1 is integrally formed with a hub cover portion 5 which covers the hub portion 54, a rim cover portion 2 which covers the rim flange portion 58, a plurality of (for example, seven) spoke cover portions 3, each of which covers the spoke portion 59, and a plurality of (for example, seven) recessed portions 6, each of which enters the penetration portion 51 so as to cover and shield the penetration portion 51.

In the top views in FIGS. 1 and 3, the hub cover portion 5 is formed so as to overlap with the hub surface 54*a* and to be distanced from the hub surface 54*a*, and is formed in a plane shape perpendicular to an axial direction. The radial inner end of each spoke cover portion 3 is integrally and smoothly continuous to the outer periphery of the hub cover portion 5.

The rim cover portion 2 is provided so as to overlap with the rim surface 58*b* in a top view, and is provided along the rim surface 58*b* so as to come into contact with (come into close contact with) the rim surface 58*b*. The radial outer end of the spoke cover portion 3 is integrally and smoothly continuous to the inner periphery of the rim cover portion 2.

The spoke cover portion 3 is provided so as to overlap with the spoke surface 59*a* in a top view. In the spoke cover portion 3, a portion which is disposed on the radial outside of the curved top portion 59*d* is formed along the spoke surface 59*a* so as to come into contact with (come into close contact with) the spoke surface 59*a*. A portion which is disposed on the radial inside of the curved top portion 59*d* is distanced from the spoke surface 59*a*, and is formed in a plane shape substantially perpendicular to an axial direction. That is, the hub portion 54 and the radial inner portion of the spoke portion 59 are covered by the hub cover portion 5 and the radial inner portion of the spoke cover portion 3 with a gap therebetween. The spoke cover portion 3 is formed in an axisymmetric shape similar to the case of the spoke portion 59.

A portion located from the radial inner portion of the spoke cover portion 3 to the outer periphery of the hub cover portion 5 is provided with a bellows portion 8 which is formed in a plurality of convex and concave shapes so as to have a circular-arc shape concentric with the rustproof cover 1. By means of the bellows portion 8, the radial bending states (relative displacement states) in the periphery of each recessed portion 6 and the spoke cover portion 3 are allowed.

Figure 4:
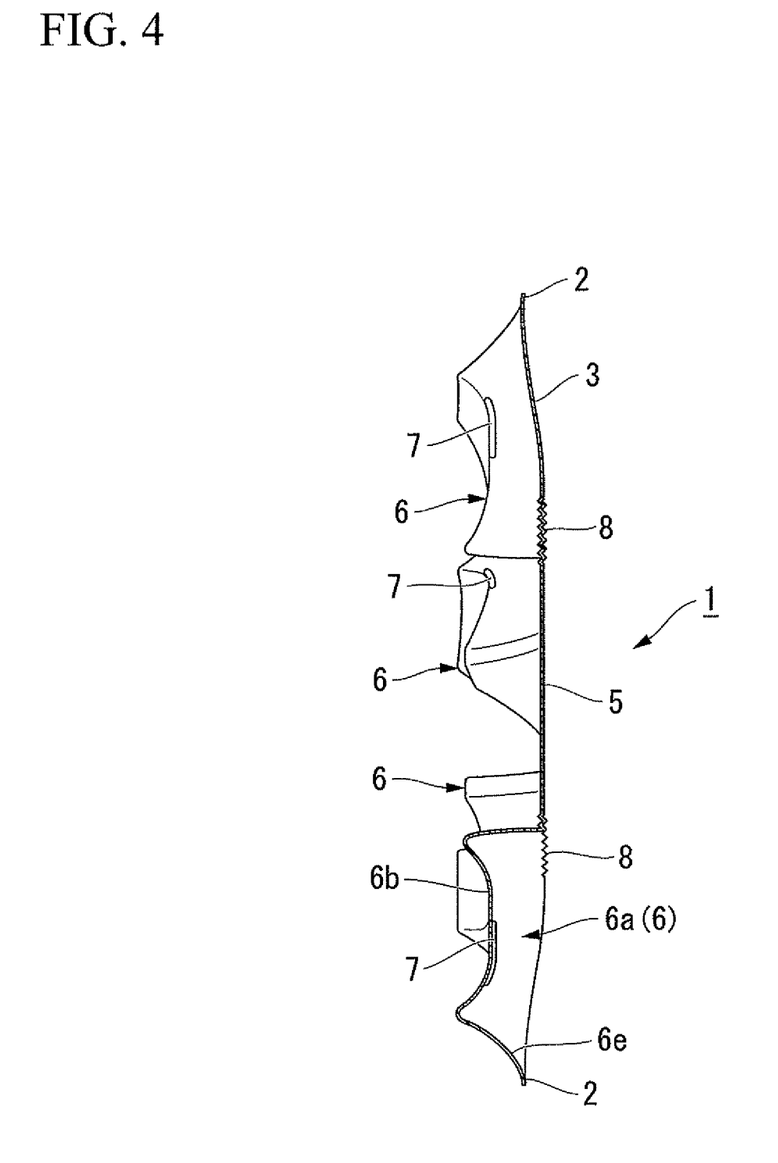
FIG. 4 is a sectional view taken along the line B-B in FIG. 3.

The recessed portion 6 is formed between the adjacent spoke cover portions 3 so as to be recessed inward in an axial direction and to enter the penetration portion 51. The recessed portion 6 includes a peripheral wall 6*a* which is formed along the inner peripheral surface 51*a* of each penetration portion 51 so as to come into contact with (come into close contact with) the inner peripheral surface 51*a* and a bottom wall 6*b* which is formed along the rear surface 55*b* of the disk portion 55 so as to shield the axial inner end of the peripheral wall 6*a* (penetration portion 51).

The peripheral wall 6*a* of the recessed portion 6 includes a pair of inner and outer spoke side peripheral walls 6*c* and 6*d* which respectively matches with the pair of inner and outer spoke side surfaces 59*b* and 59*c* in the penetration portion 51 and a rim-side peripheral wall 6*e* which matches with the rim inner peripheral surface 58*a*. The shape of each peripheral wall is formed along the rim inner peripheral surface 58*a* and the inner and outer spoke side surfaces 59*b* and 59*c*. The recessed portion 6 is formed in an axisymmetric shape in the same manner as the penetration portion 51.

In addition, the rim-side peripheral wall 6*e* of one recessed portion 6 is provided with a valve insertion hole 4*a* which allows an air valve V to pass therethrough.

The bottom wall 6*b* of the recessed portion 6 is formed in a curved shape which protrudes outward in an axial direction along the rear surface 59*e* of the spoke portion 59 (the rear surface 55*b* of the disk portion 55) in the sectional views in FIGS. 2 and 4. In addition, the bottom wall 6*b* is formed in a plane shape so as to be disposed between the rear surfaces 59*e* of the adjacent spoke portions 59 in the sectional view in FIG. 5.

Figure 5:
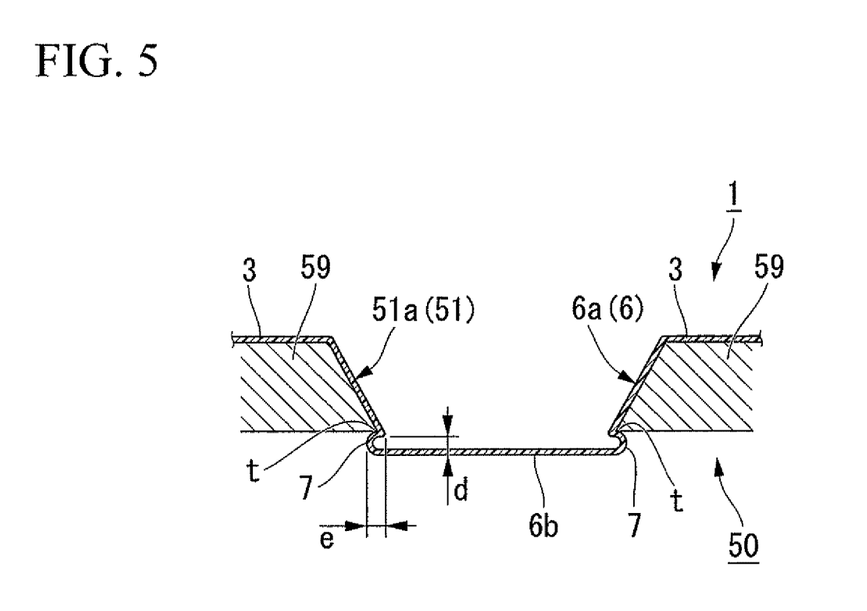
FIG. 5 is a sectional view taken along the line C-C in FIG. 1.

The bottom wall 6*b* is formed to be closer to the rear-surface portion of the disk portion 55 (the inside of the wheel 50) than the rear surface 55*b* of the disk portion 55 by a predetermined amount (the dimension d in FIG. 5 and 4 mm in this embodiment). Each ridge portion formed between the radial middle portion of the bottom wall 6*b* and the pair of taper-shaped outer spoke side peripheral walls 6*d* is provided with a protrusion portion 7 which protrudes outward in the circumferential direction more than the outer spoke side peripheral wall 6*d* by a predetermined amount (the dimension e in FIG. 5 and 4 mm in this embodiment).

The protrusion portion 7 extends along the ridge while forming a semi-circular shape in a sectional view. When an axial outer end surface t (see FIG. 5) of the protrusion portion 7 engages with the rear surface 55*b* of the disk portion 55 in the peripheral portion of the penetration portion 51 while coming into contact with (coming into close contact with) the rear surface 55*b*, it is possible to prevent the recessed portion 6 from being separated from the penetration portion 51, and thus to prevent the rustproof cover 1 from being separated from the disk portion 55.

Next, an effect of the rustproof cover 1 will be described.

First, in order to attach the rustproof cover 1 to the wheel 50, the circumferential portion of the rustproof cover 1 with respect to the wheel 50 is first aligned on the basis of the position of the air valve V. Subsequently, the rustproof cover 1 is pressed in an axial direction so as to be attached to the disk portion 55. Subsequently, the air valve V is inserted through the valve insertion hole 4a of the rustproof cover 1, and the recessed portion 6 of the rustproof cover 1 is inserted into the corresponding penetration portion 51 of the wheel 50.

At this time, since the whole rustproof cover 1 is formed of a thin flexible resin, the protrusion portion 7 is bent while coming into contact with the taper-shaped inner peripheral surface 51a (the outer spoke side surface 59c) in the penetration portion 51. In accordance with this movement, the recessed portion 6 including the bottom wall 6b is bent. Accordingly, the recessed portion 6 having the protrusion portion 7 is inserted into the penetration portion 51.

Subsequently, when the protrusion portion 7 passes through the penetration portion 51 and arrives at the rear-surface portion of the disk portion 55, the whole recessed portion 6 and the protrusion portion 7 is restored to the state before the bending occurs, and the protrusion portion 7 engages with the rear surface 55b of the disk portion 55, thereby regulating the recessed portion 6 from being separated from the penetration portion 51 and allowing the peripheral wall 6a of the recessed portion 6 to come into close contact with the inner peripheral surface 51a of the penetration portion 51. As a result, the rustproof cover 1 is completely attached to the wheel 50. In this manner, it is possible to attach the rustproof cover 1 to the wheel 50 just by pressing the rustproof cover 1 inward in an axial direction.

In the state where the rustproof cover 1 is attached to the wheel 50, the penetration portion 51 is shielded by the bottom wall 6b of the recessed portion 6 on the side of the rear surface 55b of the disk portion 55. At this time, the peripheral wall 6a of the recessed portion 6 comes into close contact with the inner peripheral surface 51a of the penetration portion 51 so as to remove a gap therebetween, and the relative displacement between the recessed portions 6 is allowed by means of the bellows portion 8. Accordingly, since a formation error or the like of the rustproof cover 1 is allowed, the peripheral wall 6a of the recessed portion 6 satisfactorily comes into close contact with the inner peripheral surface 51a of the penetration portion 51.

Particularly, since a pressing force is applied to the recessed portion 6 toward the outside in a radial direction by means of an elastic force of the bellows portion 8, it is possible to satisfactorily maintain close contact between the rim-side peripheral wall 6e of the recessed portion 6 adjacent to the outer peripheral edge of the rustproof cover 1 and the rim inner peripheral surface 58a of the penetration portion 51. Accordingly, since communication between the inside and outside portions of the wheel 50 via the penetration portion 51 is interrupted, it is possible to suppress the generation of rust in the rotor of the disk brake disposed inside the wheel 50.

Incidentally, since a heat expansion coefficient of the resinous rustproof cover 1 is different from that of the metallic wheel 50, the rustproof cover 1 may expand or contract with respect to the wheel 50 in accordance with a variation in the ambient temperature.

However, the whole rustproof cover 1 including the recessed portion 6 is formed of a thin flexible resin. Accordingly, for example, in the case where the rustproof cover 1 expands with respect to the wheel 50, it is possible to allow the expanding amount of the rustproof cover 1 by means of the appropriately bent peripheral portion and the like of the recessed portion 6. Also, it is possible to prevent such a problem that the rustproof cover 1 is difficult to be attached to or detached from the wheel 50 or the engagement portion between the wheel 50 and the rustproof cover 1 is broken. In addition, in the case where the rustproof cover 1 contracts with respect to the wheel 50, since the protrusion portion 7 has a sufficient engagement allowance for the rear surface 55b of the disk portion 55, it is possible to prevent such a problem that the engagement of the protrusion portion 7 is released to thereby separate the rustproof cover 1 from the wheel 50.

In the case where the rustproof cover 1 is separated from the wheel 50 by a consignee, if the rustproof cover 1 is just pulled outward in an axial direction so as to be separated therefrom, the protrusion portion 7 formed of a thin flexible resin is bent. Accordingly, it is possible to release the engagement between the protrusion portion 7 and the rear surface 55b of the disk portion 55, and to take out the recessed portion 6 from the penetration portion 51. As a result, it is possible to separate the rustproof cover 1 from the wheel 50.

Likewise, since the rustproof cover 1 is formed as an integral product which is formed of a thin flexible resin, it is possible to suppress an increase in the manufacture cost. In addition, since the protrusion portion 7 engages with the rear surface 55b of the disk portion 55 by means of the flexibility and elasticity thereof, the rustproof cover 1 can be easily attached to or detached from the wheel 50 and to suppress an effect caused by a difference in the heat expansion coefficients between the rustproof cover 1 and the wheel 50.

As described above, the rustproof cover 1 of the automobile disk brake according to this embodiment is attached to the surface of the disk portion 55 of the wheel 50 so as to shield the penetration portion 51 penetrating the wheel 50 provided in the disk portion 55. The rustproof cover 1 is formed of a thin flexible resin and includes the recessed portion 6 which enters the penetration portion 51 along the surface shape of the disk portion 55 and arrives at the rear-surface portion of the disk portion 55. A portion of the recessed portion 6 extending to the rear-surface portion is provided with the protrusion portion 7 which engages with the rear surface 55b of the disk portion 55 so as to prevent the recessed portion 6 from being separated from the surface of the disk portion.

According to this embodiment, the engagement amount (engagement allowance) of the protrusion portion 7 with respect to the rear surface 55b of the disk portion 55 is set to a minimum value by predicting a difference in the heat expansion coefficients between the rustproof cover 1 and the wheel 50 formed of metal such as aluminum alloy. Accordingly, at the time when the rustproof cover 1 is attached to or detached from the wheel 50, it is possible to carry out the attaching or detaching operation of the rustproof cover 1 by bending the peripheral portion of the protrusion portion 7 with respect to the penetration portion 51 in such a manner that the recessed portion 6 is pressed into the penetration portion 51 or is taken out from the penetration portion 51. That is, it is possible to easily attach or detach the rustproof cover 1 to or from the wheel 50 with a simple configuration.

In addition, even in the case where the rustproof cover 1 expands or contracts with respect to the wheel 50 due to a difference in the heat expansion coefficients between the rustproof cover 1 and the wheel 50, since the whole cover is formed of a flexible resin, it is possible to prevent difficulty to attach or detach the rustproof cover 1 to or from the wheel 50, and occurring the separation or breakage of the rustproof cover 1 from the wheel 50. That is, it is possible to suppress an effect caused by a difference in the heat expansion coefficients between the rustproof cover 1 and the wheel 50.

Further, in the rustproof cover 1, the recessed portion 6 includes the peripheral wall 6a which is formed along the inner peripheral surface 51a of the penetration portion 51 and the bottom wall 6b which is formed along the rear surface 55b of the disk portion 55. Since the pair of protrusion portions 7 is provided with the bottom wall 6b of the recessed portion 6 interposed therebetween, it is possible to form the economic recessed portion 6 which is formed along the inner peripheral shape of the penetration portion 51 and suppresses a protrusion amount thereof from the rear-surface portion of the disk portion 55. In addition, since the pair of protrusion portions 7 is provided with the bottom wall 6b of the recessed portion 6 interposed therebetween, it is possible to reliably prevent the rustproof cover 1 from being separated from the wheel 50.

Furthermore, in the rustproof cover 1, the plurality of recessed portions 6 is provided in correspondence to the plurality of penetration portions 51, and the bellows portion 8 is provided so as to allow the relative displacement between the recessed portions 6. Accordingly, it is possible to allow the formation error or the like of the rustproof cover 1. As a result, it is possible to satisfactorily shield the penetration portion 51 of the wheel 50 by means of the recessed portion 6.

Moreover, since the configuration of the above-described embodiment is an example of the invention, the detailed shape, size, quantity, arrangement, material, and the like may be modified into various forms without departing from the scope of the invention.

INDUSTRIAL APPLICABILITY

In the rustproof cover for the automobile disk brake according to the invention, it is possible to easily attach or detach the rustproof cover to or from the wheel with a simple configuration and to suppress an effect caused by a difference in the heat expansion coefficients between the rustproof cover and the wheel.

DESCRIPTION OF REFERENCE NUMERALS

1: RUSTPROOF COVER
6: RECESSED PORTION
7: PROTRUSION PORTION
50: WHEEL
51: PENETRATION PORTION
55: DISC PORTION
55b: REAR SURFACE

The invention claimed is:

1. A rustproof cover for an automobile disk brake which is attached to a surface portion of a disk portion of an automobile wheel so as to shield a plurality of penetration portions penetrating the disk portion in a direction from the surface portion of the disk portion to a rear-surface portion thereof, the rustproof cover comprising:
   a plurality of recessed portions which are recessed from the surface portion of the disk portion to the rear-surface portion thereof so as to follow the shape of each penetration portion;
   a hub cover portion which covers a hub portion which forms a center portion of the disk portion;
   a rim cover portion which covers a rim flange portion which forms an outer peripheral edge of the disk portion; and
   a plurality of spoke cover portions which cover a plurality of the spoke portions which are formed between the hub portion and the rim flange portion, wherein:
   each of the recessed portions includes a protrusion portion which engages with a rear surface of the disk portion at the rear-surface portion of the disk portion to prevent the rustproof cover from being separated from the wheel,
   the rustproof cover is formed of a flexible resin,
   a bellows portion is provided at a portion located from a radial inner portion of the spoke cover portion to an outer periphery of the hub cover portion so as to have a circular-arc shape concentric with the rust proof cover, and
   each of the penetration portions is formed between the adjacent spoke portions.

* * * * *